United States Patent
Nagahama (10) Patent No.: US 7,174,192 B2
(45) Date of Patent: Feb. 6, 2007

(54) METHOD FOR CONTROLLING A HANDS FREE SYSTEM, RADIO APPARATUS, AND HANDS FREE APPARATUS

(75) Inventor: Kentaro Nagahama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 10/952,797

(22) Filed: Sep. 30, 2004

(65) Prior Publication Data

US 2005/0227741 A1    Oct. 13, 2005

(30) Foreign Application Priority Data

Apr. 7, 2004    (JP)    ............................ P2004-113013

(51) Int. Cl.
*H04M 1/00*    (2006.01)
*H04B 7/15*    (2006.01)
*H04Q 7/00*    (2006.01)

(52) U.S. Cl. ............................. 455/569.1; 455/569.2; 455/567; 455/11.1; 370/329; 370/341; 370/331; 370/242; 370/264; 370/268; 370/269; 370/287; 370/322

(58) Field of Classification Search ............. 455/569.1, 455/569.2, 567, 11.1, 11.41, 11.66
See application file for complete search history.

(56) References Cited

U.S. PATENT DOCUMENTS

| | | | |
|---|---|---|---|
| 7,016,707 B2 * | 3/2006 | Fujisawa et al. ............ | 455/567 |
| 2003/0045235 A1 * | 3/2003 | Mooney et al. ............... | 455/41 |
| 2005/0070338 A1 | 3/2005 | Nagahama et al. | |
| 2005/0113149 A1 | 5/2005 | Tamura et al. | |

FOREIGN PATENT DOCUMENTS

| | | |
|---|---|---|
| EP | 1 259 052 A2 | 11/2002 |
| EP | 1 401 179 A2 | 3/2004 |
| JP | 6-61939 | 3/1994 |
| JP | 2000-295178 | 10/2000 |
| JP | 2002 300648 | 10/2002 |
| JP | 2003-115918 | 4/2003 |
| JP | 2003-318807 | 11/2003 |

OTHER PUBLICATIONS

European Search Report dated Jul. 22, 2005, of European Application No. 4255963.3.
Bluetooth SIG, "Hands-Free Profile Adopted Version 1.0", pp. 1–73, (Apr. 29, 2003).

* cited by examiner

*Primary Examiner*—Joseph Feild
*Assistant Examiner*—Julio Perez
(74) *Attorney, Agent, or Firm*—Finnegan, Henderson, Farabow, Garrett & Dunner, L.L.P.

(57) ABSTRACT

A radio apparatus, to be used as a first ending node of a communication network, is connectable to a hands-free apparatus by a local radio link to form a hands-free system. A call made on the hands-free apparatus for an second ending node in the communication network is sent to the radio apparatus through a control channel on the local radio link. The radio apparatus and the hands-free apparatus arrange a voice channel to be established on the local radio link. The call is then sent to the second ending node. In a case where no voice channel is established within a predetermined time period after arranging the voice channel, the radio apparatus cancels the call to prevent a connection between the radio apparatus and the second ending node from being kept and charged.

12 Claims, 9 Drawing Sheets

METHOD FOR CONTROLLING A HANDS FREE SYSTEM, RADIO APPARATUS, AND HANDS FREE APPARATUS

CROSS REFERENCE TO RELATED APPLICATIONS

This application is based upon and claims the benefit of priority from the prior Japanese Patent Application No. 2004-113013 filed on Apr. 7, 2004; the entire contents of which are incorporated herein by reference.

FIELD OF THE INVENTION

The present invention relates to a method for controlling a hands-free system, a radio apparatus, and a hands-free apparatus.

DESCRIPTION OF THE BACKGROUND

Radio communications are now widely used, including on moving vehicles or in any busy situations. Hands-free systems are used for such kinds of radio communications to assure traffic safety or any kind of conveniences.

A hands-free system is formed by a radio apparatus, e.g., a cellular phone, and a hands-free apparatus linked to the radio apparatus by a local radio link. Examples of such a local radio link are Bluetooth (TM) and a wireless local area network (WLAN). A standardized hands-free profile to support such kinds of applications is provided in the Bluetooth specifications.

Here is assumed a hands-free system formed by a radio apparatus and a hands-free apparatus. The hands-free apparatus has a microphone, a loud speaker, and an operation panel. The hands-free apparatus is connectable to the radio apparatus by a local radio link, and the radio apparatus may be set normal, i.e., to be used while being held by a human hand, or hands-free. When the radio apparatus is set hands-free, a control channel is established on the local radio link.

The radio apparatus is used as an ending node of a communication network. While the radio apparatus is set hands-free, a call addressed to another ending node of the communication network may be made on the hands-free apparatus by operating the operation panel. The call is transferred to the radio apparatus and then sent to the addressed ending node. The hands-free apparatus and the radio apparatus arrange a voice channel to be established on the local radio link to enable a hands-free voice communication with the addressed ending node.

There may be a case where the call is accepted on the addressed ending node, and no voice channel is established on the local radio link. Such a case occurs due to, e.g., an obstacle that happens to exist between the hands-free apparatus and the radio apparatus and block the wave path of the local radio link. In this case, a connection between the radio apparatus and the addressed ending node has been established on the communication network and may continue being kept and charged while the intended hands-free voice communication is disturbed.

A radio apparatus was improved to alleviate a similar, but not exactly the same problem, and the improved radio apparatus is disclosed in the Japanese published patent applications, e.g., 2002-300648, the English version of which is available on the Japan Patent Office website.

This radio apparatus is used as an ending node of a communication network, and is linked to a hands-free apparatus by a local radio link to form a hands-free system. The radio apparatus establishes a voice channel on the local radio link with the hands-free apparatus, and a connection with a second ending node of the communication network. A hands-free voice communication is thus enabled between the hands-free system and the second ending node. The radio apparatus releases the connection with the second ending node in a case where the performance of the local radio link is deteriorated during the hands-free voice communication.

This conventional technique, however, does not solve the problem that a connection with the second ending node may be established and charged although a voice channel on the local radio link fails to be established and an intended hands-free voice communication is disturbed.

SUMMARY OF THE INVENTION

To solve the technical problem described above, an advantage of the present invention is to prevent a connection between the radio apparatus and the addressed ending node from being established and charged before a voice channel is established between the radio apparatus and the hands-free apparatus on the local radio link.

According to one aspect of the present invention to achieve the above advantage, there is provided a method for controlling a hands-free system formed by a radio apparatus and a hands-free apparatus connectable to each other by a local radio link. The radio apparatus is configured to be a first ending node of a communication network, and the hands-free apparatus is configured to enable an operation to make a call thereon, and to input and output spoken messages in a hands-free manner. The method for hands-free control comprises establishing a control channel on the local radio link, making a call for a second ending node of the communication network by operating the hands-free apparatus, sending the call from the hands-free apparatus to the radio apparatus through the control channel, arranging a voice channel to be established on the local radio link; sending the call from the radio apparatus to the second ending node after arranging the voice channel, conducting a hands-free voice communication between the hands-free system and the second ending node in a first case where the voice channel is established within a predetermined time period after arranging the voice channel, and canceling the call from the radio apparatus to the second ending node not to conduct the hands-free voice communication, in a second case where no voice channel is established within the predetermined time period after arranging the voice channel.

DETAILED DESCRIPTION OF THE INVENTION

Figure 1:
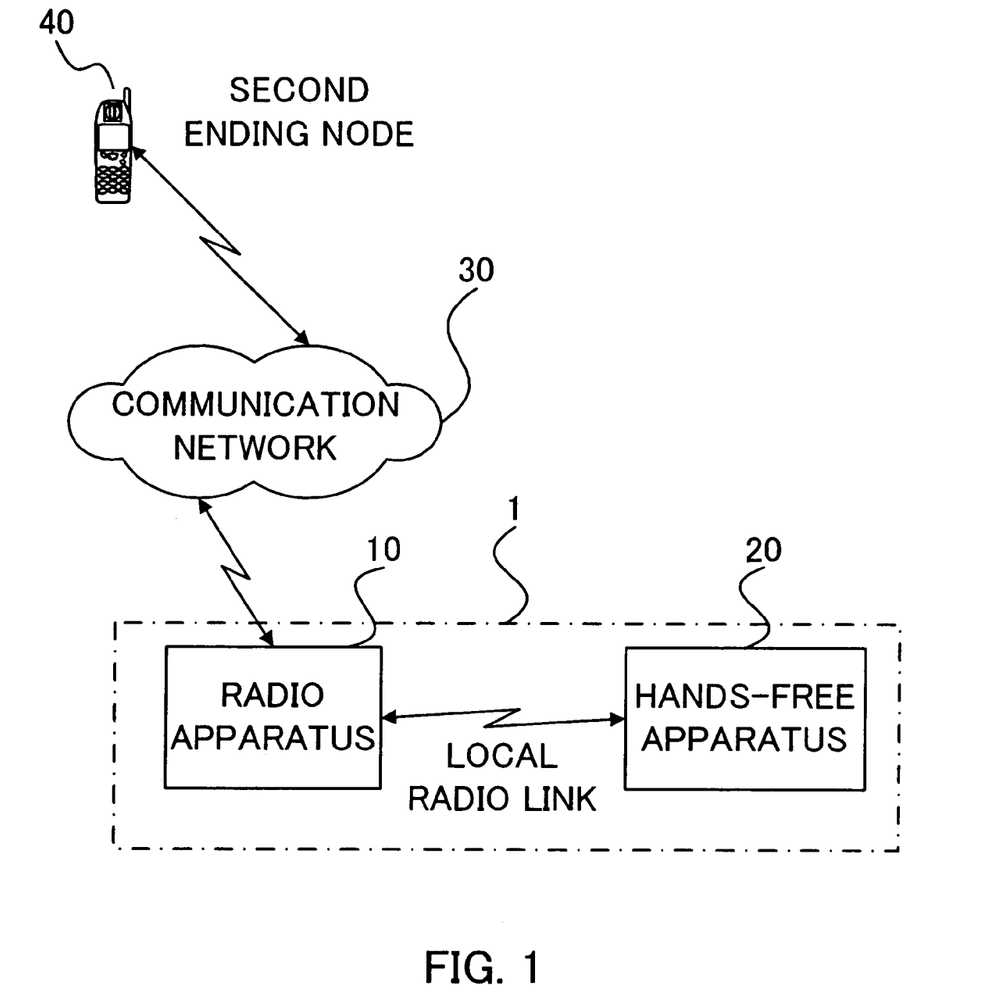
FIG. 1 is a block diagram of a first embodiment of a hands-free system of the present invention.

A first embodiment of the present invention will now be described with reference to FIG. 1 through FIG. 3. FIG. 1 is a block diagram of a hands-free system of the first embodiment.

The hands-free system 1 is formed by a radio apparatus 10 and a hands-free apparatus 20. The radio apparatus 10 is used as a first ending node of a communication network 30. A second ending node 40 is connected to the communication network 30. An example of the second ending node 40 is, although not limited to, a cellular phone. The radio apparatus 10 and the hands-free apparatus 20 are connectable to each other by a local radio link, e.g., Bluetooth (™) or WLAN. The radio apparatus 10 may be set either normal, i.e., to be used being held by a human hand, or hands-free.

The hands-free apparatus 20 has, e.g., a panel on which an operation is performed to make a call for other ending nodes including the second ending node 40. The panel may be actually or virtually (e.g., on a screen) implemented. The hands-free apparatus 20 has, e.g., a microphone and a loud speaker to enable voice inputs and outputs in a hands-free manner.

Figure 2:
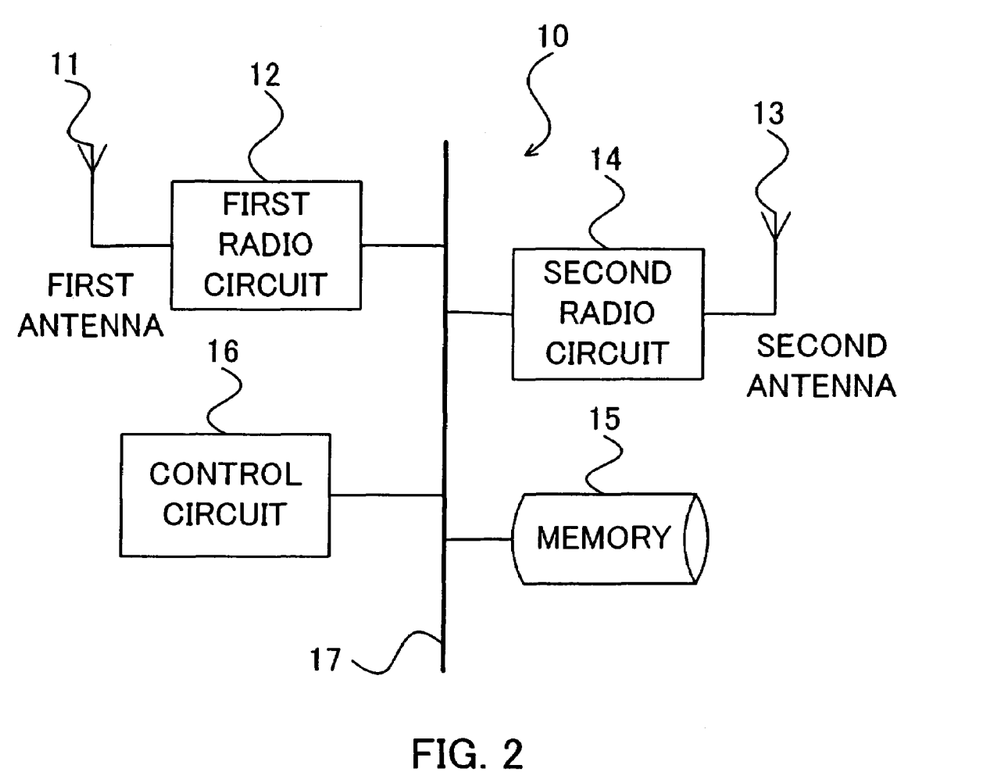
FIG. 2 is a block diagram of a main part of a radio apparatus of the first embodiment.

FIG. 2 is a block diagram of a main part of the radio apparatus 10 shown in FIG. 1. The radio apparatus 10 has a first antenna 11 used for sending and receiving radio signals to and from the communication network 30 (more precisely a radio station belonging thereto). These radio signals carry data and voice conveyed by the communication network 30.

The first antenna 11 is connected to a first radio circuit 12 that performs transmission of radio signals including coding, modulation, amplification, and so on, and reception of radio signals including amplification, demodulation, decoding, and so on.

The radio apparatus 10 has a second antenna 13 used for sending and receiving local radio signals to and from the hands-free apparatus 20. These local radio signals carry data through a control channel established on the local radio link, and carry voice through a voice channel established on the local radio link.

The second antenna 13 is connected to a second radio circuit 14 that performs transmission of local radio signals including coding, modulation, amplification, and so on, and reception of local radio signals including amplification, demodulation, decoding, and so on.

The radio apparatus 10 has a memory 15 on which stored is a directory of ending nodes in the communication network 30.

The radio apparatus 10 has a control circuit 16 that is connected to the first radio circuit 12, the second radio circuit 14, and the memory 15 via a common bus 17.

The radio apparatus 10 sends and receives radio signals to and from the communication network 30 with the first radio unit 12 and the first antenna 11, and sends and receives local radio signals to and from the hands-free apparatus 20 with the second radio unit 14 and the second antenna 13, as controlled by the control circuit 16. A sequence including such sending and receiving will be described later. The control circuit 16 is, e.g., a microprocessor or a digital signal processor, and performs a hands-free control of the first embodiment.

The radio apparatus 10 receives a call made on the radio apparatus 10 or the hands-free apparatus 20, for any other ending node in the communication network 30. The control circuit 16 then looks up the directory in the memory 15 with reference to the destination of the call, to find out a numeral or a code identifying the addressed ending node in the communication network 30.

A method for controlling the hands-free system 1 in the first embodiment will be described with reference to FIG. 3, which is a diagram of a processing sequence and signal flows among the second ending node 40, the radio apparatus 10, and the hands-free apparatus 20 in the first embodiment.

The radio apparatus 10 exchanges data necessary to establish a control channel with the hands-free apparatus 20, according to a specified protocol of the local radio link. Local radio signals carrying these data are sent and received with the second radio circuit 14 and the second antenna 13. As the result a control channel is established on the local radio link (Step "S1"). The control circuit 16 sets the radio apparatus 10 hands-free.

When a call for the second ending node 40 is made on the hands-free apparatus 20 (Step "S2"), the call is sent to the radio apparatus 10 through the control channel. The radio apparatus 10 receives the call with the second antenna 13 and the second radio circuit 14 (Step "S3").

The control circuit 16 looks up the directory in the memory 15 to find out a numeral or a code identifying the second ending node 40 in the communication network 30 (Step "S4"). When such a numeral or a code is found out, the radio apparatus 10 informs the hands-free apparatus 20 that the call is available (Step "S5"). Steps "S4" and "S5" may be omitted in a case where the call is made on the hands-free apparatus 20 designating the numeral or the code identifying the second ending node 40.

The radio apparatus 10 arranges a voice channel to be established with the hands-free apparatus 20 by exchanging necessary data, according to a specified protocol of the local radio link (Step "S6"). The radio apparatus 10 sends the call to the second ending node 40 after arranging the voice channel (Step "S7"), although the voice channel has not yet been established at this moment.

In a case where the voice channel is established within a predetermined time period after arranging the voice channel ("YES" of Step "S8"), and the call is accepted by the second ending node 40, the radio apparatus 10 receives incoming voice messages from the second ending node 40, and transfers to the hands-free apparatus 20 through the voice channel. The radio apparatus 10 receives outgoing voice messages from the hands-free apparatus 20 and sends to the second ending node 40 vice versa. A hands-free voice communication is thus conducted between the hands-free system 1 and the second ending node 40 (Step "S11"). This sequence goes through a circled "A" as illustrated in FIG. 3.

In a case where no voice channel is established within a predetermined time period ("NO" of Step "S8") after arranging the voice channel, the radio apparatus 10 cancels the call by, e.g., sending a control signal to cancel the call to the second ending node 40 (Step "S9"). Such a case occurs due to, e.g., an obstacle that happens to exist between the radio apparatus 10 and the hands-free apparatus 20, and blocks the wave path of the local radio link.

The radio apparatus 10 informs the hands-free apparatus 20 that the call has been canceled (Step "S10"). The radio apparatus 10 and the hands-free apparatus go back to the state before Step "S2". This sequence goes through a circled "B" as illustrated in FIG. 3. Thus no hands-free voice communication is conducted.

According to the first embodiment described above, a call made on the hands-free apparatus and sent to the addressed ending node is canceled in a case where no voice channel is established within a predetermined time period, and thus prevented is a connection with the addressed ending node from being kept and charged.

A second embodiment of the present invention will now be described with reference to FIG. 4. FIG. 1 and FIG. 2 will also be referenced as a hands-free system in the second embodiment has the same configuration as the one in the first embodiment shown in FIG. 1 and FIG. 2. The same reference numerals given to the apparatuses, components or circuits in these figures will be used in the following description, and a detailed explanation of these is omitted.

Figure 3:
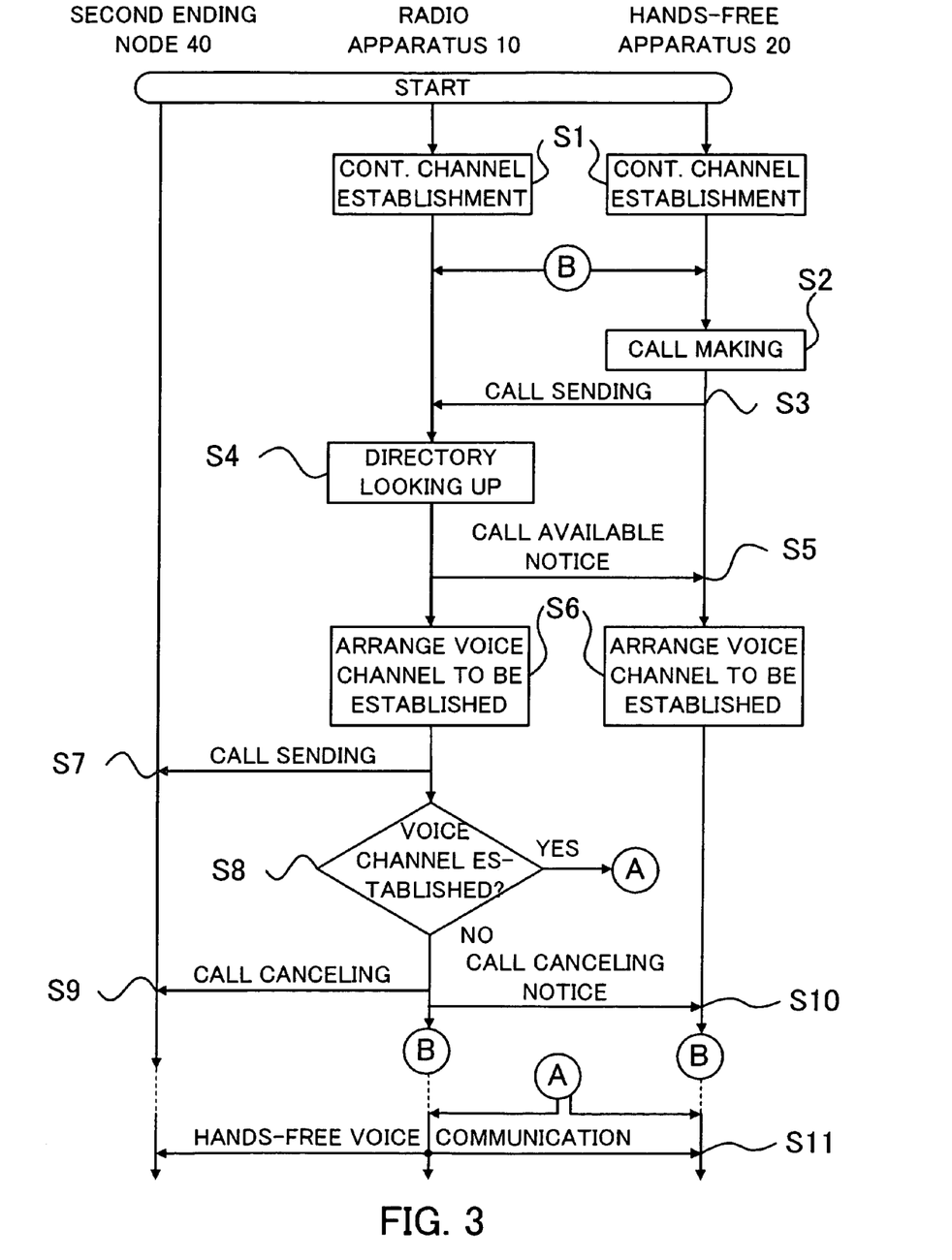
FIG. 3 is a diagram of a processing sequence and signal flows of the first embodiment of a method for controlling a hands-free system of the present invention.
Figure 4:
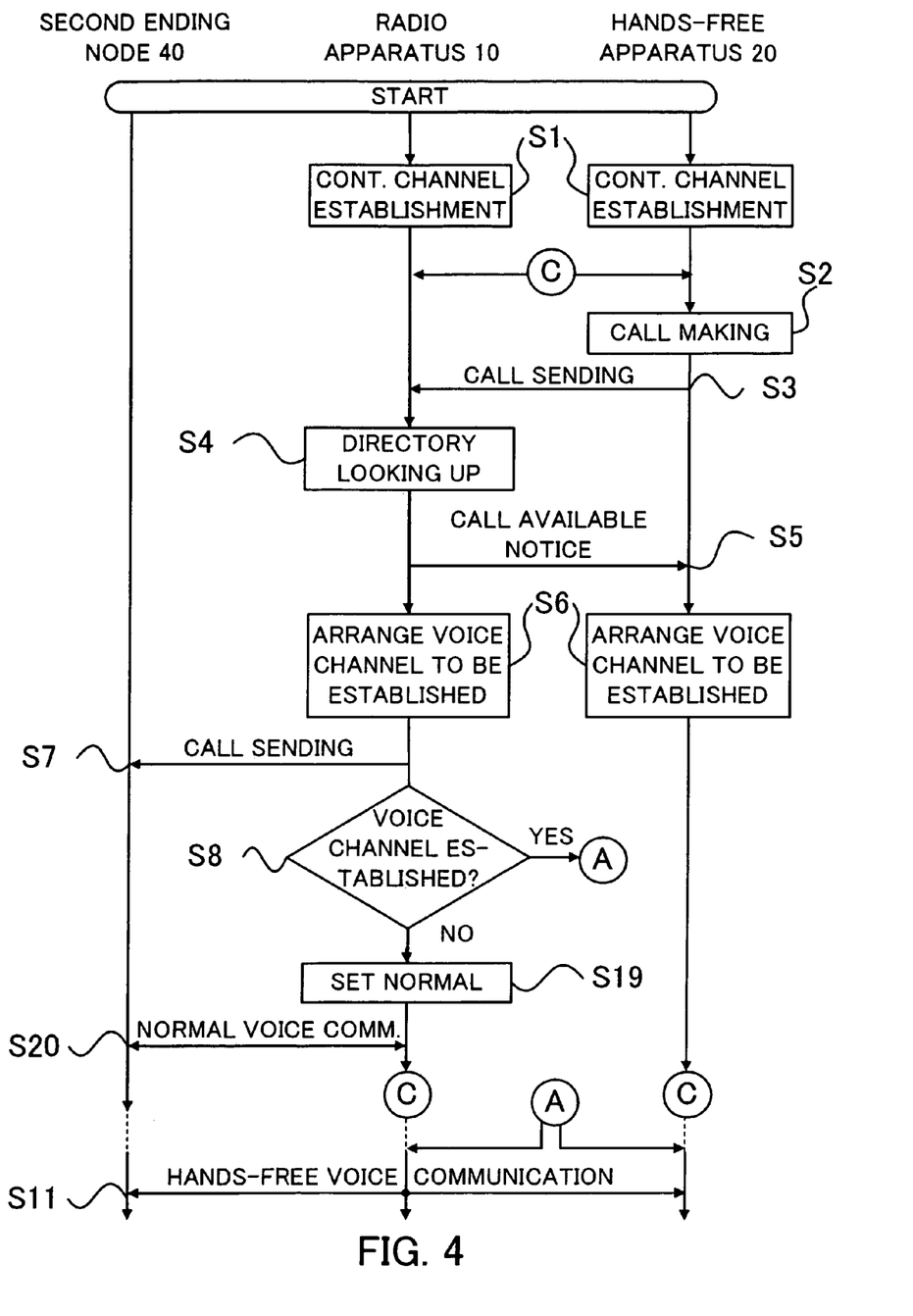
FIG. 4 is a diagram of a processing sequence and signal flows of a second embodiment of a method for controlling a hands-free system of the present invention.

FIG. 4 is a diagram of a processing sequence and signal flows among the second ending node 40, the radio apparatus 10, and the hands-free apparatus 20 of the second embodiment. Steps "S1" through "S8" and through the circled "A" (in the case of "YES" of Step "S8") to Step "S11" are the same as those in FIG. 3, and a detailed explanation of these steps is omitted.

In a case where no voice channel is established within a predetermined time period ("NO" of Step "S8") after arranging the voice channel, the control circuit 16 sets the radio apparatus 10 normal, i.e., to be used while being held by a human hand (Step "S19"). Such a case occurs due to, e.g., an obstacle as described in the first embodiment. When the call is accepted by the second ending node 40, a normal voice communication is conducted between the second ending node 40 and the radio apparatus 10 (Step "S30"). This sequence is allowable while the vehicle is not moving.

The radio apparatus 10 and the hands-free apparatus 20 go back to the state before Step "S2" after the normal voice communication finishes. This sequence goes through a circled "C" as illustrated in FIG. 4.

According to the second embodiment described above, a normal voice communication is conducted when no voice channel is established, and thus the connection between the addressed ending node and the radio apparatus is effectively used.

A third embodiment of the present invention will now be described with reference to FIG. 5. FIG. 1 and FIG. 2 will also be referenced since a hands-free system in the third embodiment has the same configuration as the one in the first embodiment shown in FIG. 1 and FIG. 2. The same reference numerals given to the apparatuses, components or circuits in these figures will be used in the following description, and a detailed explanation of these is omitted.

Figure 5:
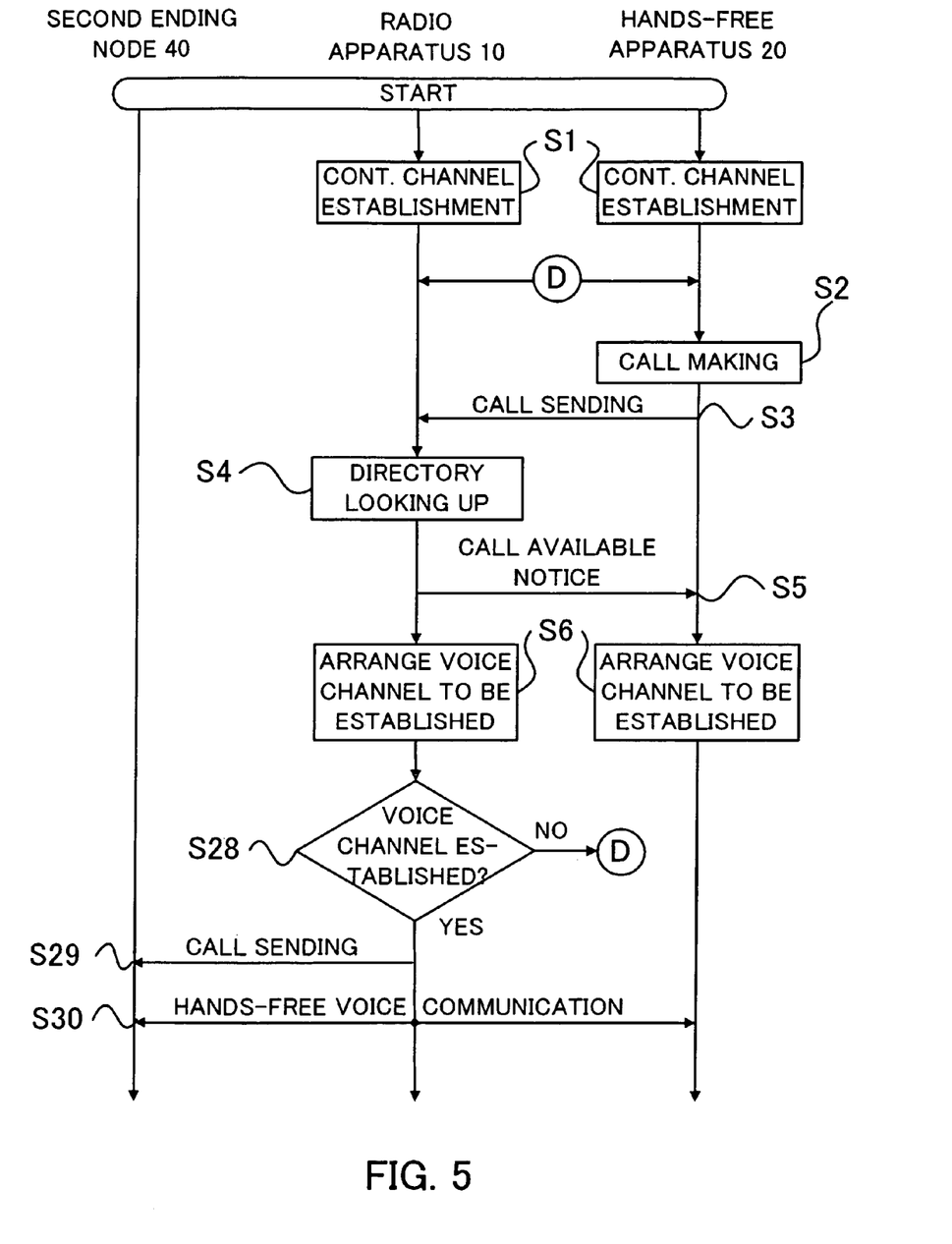
FIG. 5 is a diagram of a processing sequence and signal flows of a third embodiment of a method for controlling a hands-free system of the present invention.

FIG. 5 is a diagram of a processing sequence and signal flows among the second ending node 40, the radio apparatus 10, and the hands-free apparatus 20 of the third embodiment. Steps "S1" through "S6" are the same as those in FIG. 3, and a detailed explanation of these steps is omitted.

In a case where the voice channel is established within a predetermined time period after arranging the voice channel ("YES" of Step "S28"), the radio apparatus 10 sends the call to the second ending node 40 (Step "S29"). In other words the radio apparatus 10 does not send the call to the second ending node 40 until the voice channel is established. When the call is accepted by the second ending node 40, a hands-free voice communication is conducted between the second ending node 40 and the hands-free system 1 (Step "S30").

In a case where no voice channel is established within the predetermined time period after arranging the voice channel ("NO" of Step "S28"), the radio apparatus 10 and the hands-free apparatus 20 conduct no hands-free voice communication. Such a case occurs due to, e.g., an obstacle as described in the first embodiment. The radio apparatus 10 does not cancel the call as the call has not been sent to the second ending node 40. The radio apparatus 10 and the hands-free apparatus 20 go back to the state before Step "S2" through a circled "D" as illustrated in FIG. 5.

According to the third embodiment described above, the call made on the hands-free apparatus is not sent to the addressed ending node until a voice channel is established on the local radio link, and meanwhile prevented is a connection between the addressed ending node and the hands-free system from being established and charged.

A fourth embodiment of the present invention will now be described with reference to FIG. 6 and FIG. 7. FIG. 1 will also be referenced since a hands-free system in the fourth embodiment has the same configuration as the one in the first embodiment shown in FIG. 1. The same reference numerals given to the apparatuses, components or circuits in these figures will be used in the following description, and a detailed explanation of these is omitted.

Figure 6:
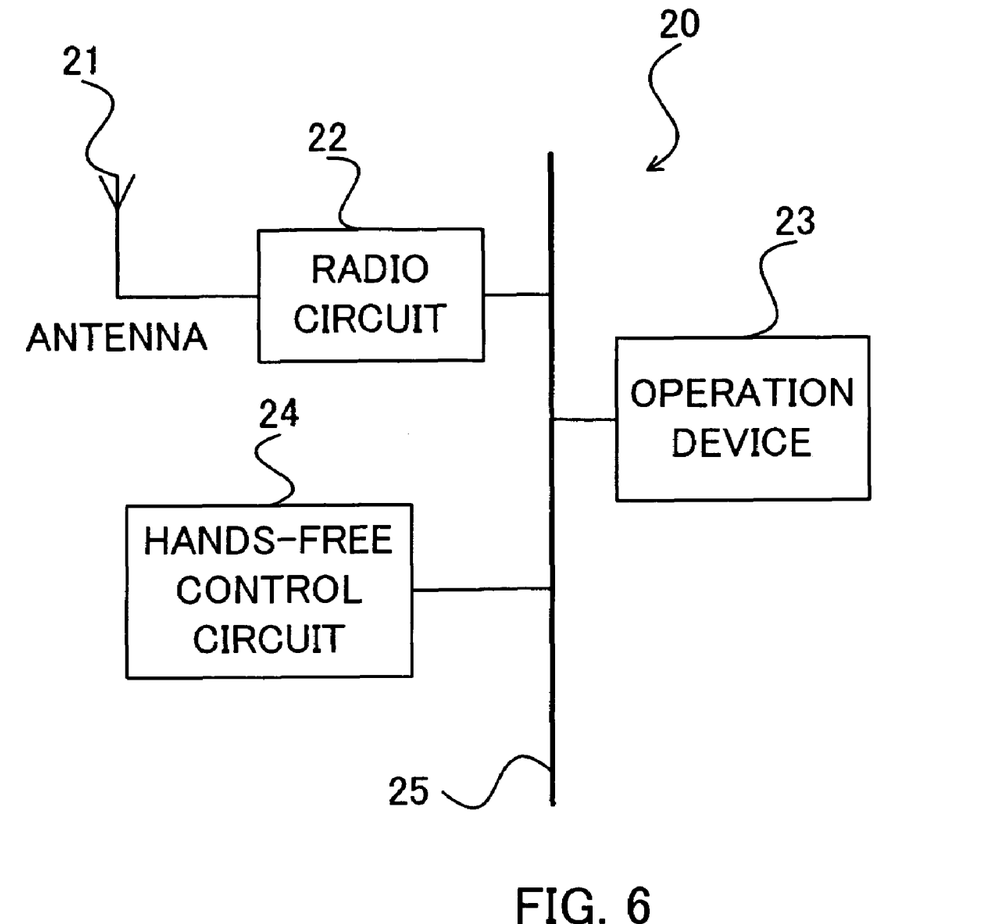
FIG. 6 is a block diagram of a fourth embodiment of a hands-free apparatus of the present invention.
Figure 7:
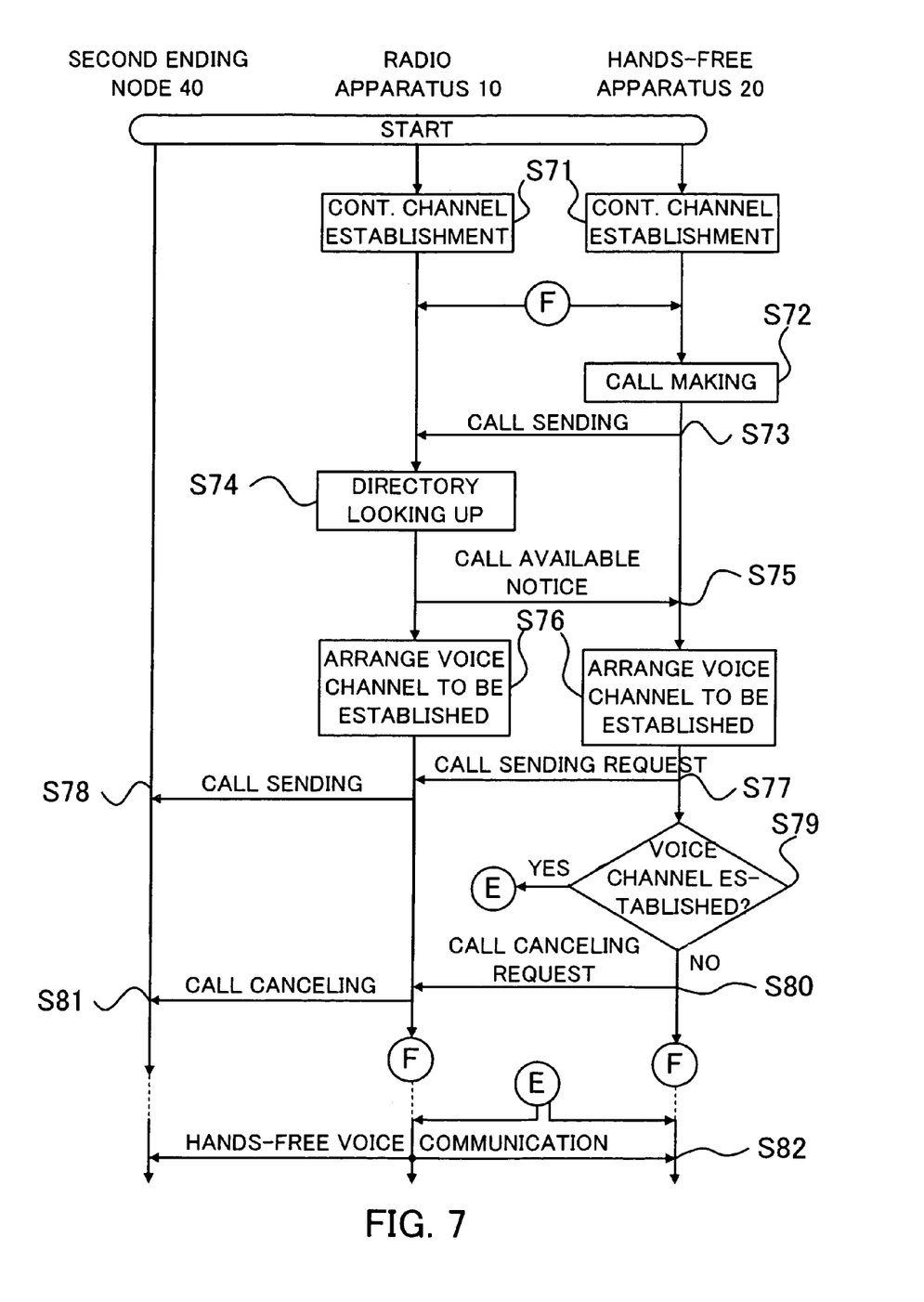
FIG. 7 is a diagram of a processing sequence and signal flows of the fourth embodiment of a method for controlling a hands-free system of the present invention.

FIG. 6 is a block diagram of a hands-free apparatus 20 of the fourth embodiment. The hands-free apparatus 20 has an antenna 21 used for sending and receiving local radio signals to and from the radio apparatus 10. These local radio signals carry data through a control channel established on the local radio link, and carry voice through a voice channel established on the local radio link.

The antenna 21 is connected to a radio circuit 22 that performs transmission of local radio signals including coding, modulation, amplification, and so on, and reception of local radio signals including amplification, demodulation, decoding, and so on.

The hands-free apparatus 20 has an operation device 23 that is, e.g., a panel physically or virtually (e.g., on a screen) implemented, on which an operation is performed to make a call for other ending nodes including the second ending node 40. The hands-free apparatus 20 has, e.g., a microphone and a loud speaker (both are not shown) to enable voice inputs and outputs in a hands-free manner.

The hands-free apparatus 20 has a hands-free control circuit 24 that is connected to the radio circuit 22 and the operation device 23 via a common bus 25.

The hands-free apparatus 20 sends and receives local radio signals to and from the radio apparatus 10 with the radio circuit 22 and the antenna 21, and has the radio apparatus 10 send and receive radio signals to and from the communication network 30, as controlled by the hands-free control circuit 24. A sequence including such sending and receiving will be described later. The hands-free control circuit 24 is, e.g., a microprocessor or a digital signal processor, and performs a hands-free control of the fourth embodiment.

The radio apparatus 10 receives a call made on the radio apparatus 10 or the hands-free apparatus 20, for any other ending node in the communication network 30. A directory in the radio apparatus 10 is then looked up with reference to the destination of the call, to find out a numeral or a code identifying the addressed ending node in the communication network 30, as described in the first embodiment.

A method for controlling the hands-free system 1 in the fourth embodiment will be described with reference to FIG. 7, which is a diagram of a processing sequence and signal flows among the second ending node 40, the radio apparatus 10, and the hands-free apparatus 20 in the fourth embodiment.

The hands-free apparatus 20 exchanges data necessary to establish a control channel with the radio apparatus 10, according to a specified protocol of the local radio link. Local radio signals carrying these data are sent and received with the radio circuit 22 and the antenna 21. As the result a control channel is established on the local radio link (Step "S71"). The radio apparatus 10 sets itself hands-free as described in the first embodiment.

When a call for the second ending node 40 is made on the operation device 23 (Step "S72"), the call is sent to the radio apparatus 10 with the radio circuit 22 and the antenna 21 through the control channel. The radio apparatus 10 receives the call as described in the first embodiment (Step "S73").

The radio apparatus 10 looks up its directory (Step "S74") and informs the hands-free apparatus 20 that the call is available (Step "S75") as in Steps "S4" and "S5" in FIG. 3. Steps "S74" and "S75" may be omitted in a case where the call is made on the operation device 23 designating the numeral or the code identifying the second ending node 40.

The hands-free apparatus 20 arranges a voice channel to be established with the radio apparatus 10 by exchanging necessary data, according to a specified protocol of the local radio link (Step "S76"). The hands-free apparatus 20 requests the radio apparatus 10, through the control channel, to send the call to the second ending node 40 (Step "S77"). The radio apparatus 10 sends the call to the second ending node 40 after arranging the voice channel (Step "S78"), although the voice channel has not yet been established at this moment.

In a case where the voice channel is established within a predetermined time period after arranging the voice channel ("YES" of Step "S79"), and the call is accepted by the second ending node 40, the hands-free apparatus has the radio apparatus 10 receive incoming voice messages from the second ending node 40 to transfer to the hands-free apparatus 20 through the voice channel. The hands-free apparatus 20 sends outgoing voice messages to the radio apparatus 10 through the voice channel to transfer to the second ending node 40 vice versa. A hands-free voice communication is thus conducted between the hands-free system 1 and the second ending node 40 (Step "S82"). This sequence goes through a circled "E" as illustrated in FIG. 7.

In a case where no voice channel is established within a predetermined time period ("NO" of Step "S79") after arranging the voice channel, the hands-free apparatus 20 requests the radio apparatus 10, through the control channel, to cancel the call sent to the second ending node 40 (Step "S80"). The radio apparatus 10 cancels the call by, e.g., sending a control signal to cancel the call to the second ending node 40 (Step "S81"). Such a case occurs due to, e.g., an obstacle as described in the first embodiment.

The radio apparatus 10 and the hands-free apparatus go back to the state before Step "S72". This sequence goes through a circled "F" as illustrated in FIG. 7. Thus no hands-free voice communication is conducted.

The fourth embodiment differs from the first embodiment in that the hands-free apparatus 20 takes an initiative to establish the control channel and the voice channel, has the radio apparatus 10 send the call after arranging the voice channel, determines if the voice channel has been established, and has the radio apparatus 10 cancel the call when no voice channel has been established.

According to the fourth embodiment described above, the hands-free system may be controlled by the hands-free apparatus and obtains the same effect as in the first embodiment.

A fifth embodiment of the present invention will now be described with reference to FIG. 8. FIG. 1 and FIG. 6 will also be referenced as a hands-free system in the fifth embodiment has the same configuration as the one in the fourth embodiment shown in FIG. 1 and FIG. 6. The same reference numerals given to the apparatuses, components or circuits in these figures will be used in the following description, and a detailed explanation of these is omitted.

Figure 8:
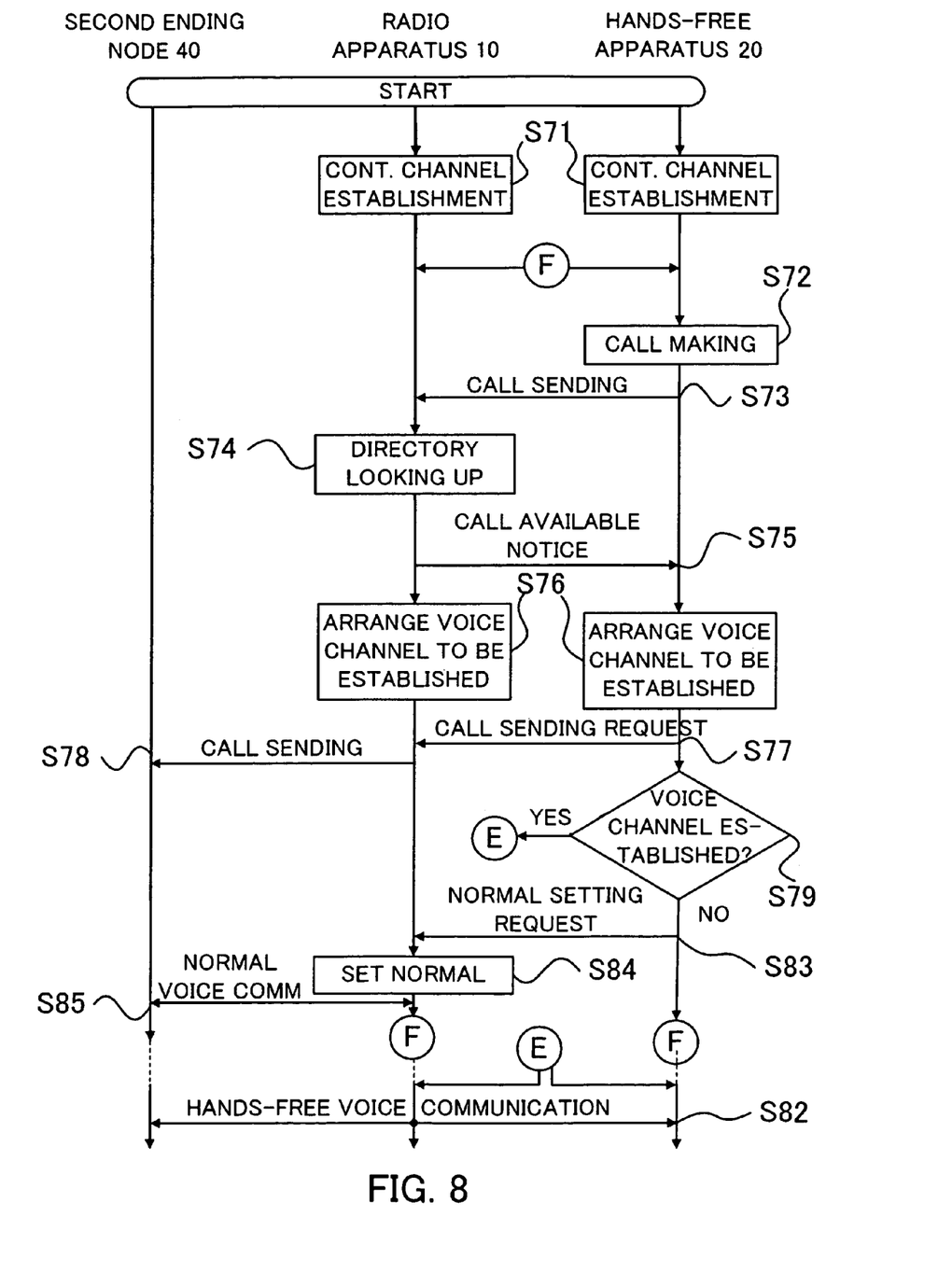
FIG. 8 is a diagram of a processing sequence and signal flows of a fifth embodiment of a method for controlling a hands-free system of the present invention.

FIG. 8 is a diagram of a processing sequence and signal flows among the second ending node 40, the radio apparatus 10, and the hands-free apparatus 20 of the fifth embodiment. Steps "S71" through "S78" and through the circled "E" (in the case of "YES" of Step "S79") to Step "S82" are the same as those in FIG. 7, and a detailed explanation of these steps is omitted.

In a case where no voice channel is established within a predetermined time period ("NO" of Step "S79") after arranging the voice channel, the hands-free apparatus 20 requests the radio apparatus 10, through the control channel, to set itself normal, i.e., to be used while being held by a human hand (Step "S83"). Such a case occurs due to, e.g., an obstacle as described in the first embodiment. When the call is accepted by the second ending node 40, a normal voice communication is conducted between the second ending node 40 and the radio apparatus 10 (Step "S85"). This sequence is allowable while the vehicle is not moving.

The radio apparatus 10 and the hands-free apparatus 20 go back to the state before Step "S72" after the normal voice communication finishes. This sequence goes through a circled "F" as illustrated in FIG. 8.

According to the fifth embodiment described above, the hands-free system may be controlled by the hands-free apparatus and obtains the same effect as in the second embodiment.

A sixth embodiment of the present invention will now be described with reference to FIG. 9. FIG. 1 and FIG. 6 will also be referenced since a hands-free system in the sixth embodiment has the same configuration as the one in the fourth embodiment shown in FIG. 1 and FIG. 6. The same reference numerals given to the apparatuses, components or circuits in these figures will be used in the following description, and a detailed explanation of these is omitted.

Figure 9:
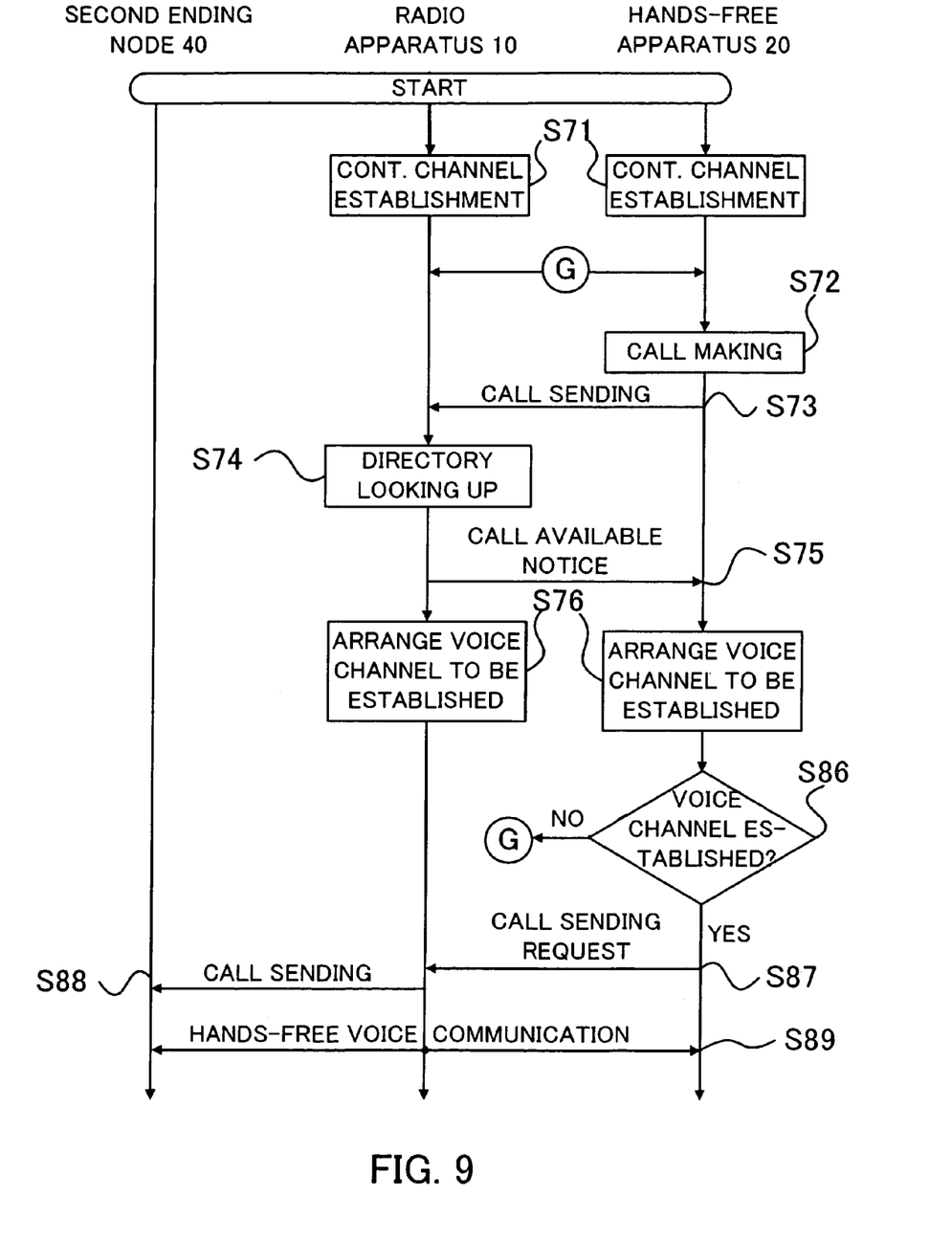
FIG. 9 is a diagram of a processing sequence and signal flows of a sixth embodiment of a method for controlling a hands-free system of the present invention.

FIG. 9 is a diagram of a processing sequence and signal flows among the second ending node 40, the radio apparatus 10, and the hands-free apparatus 20 of the third embodiment. Steps "S71" through "S76" are the same as those in FIG. 3, and a detailed explanation of these steps is omitted.

In a case where the voice channel is established within a predetermined time period after arranging the voice channel ("YES" of Step "S86"), the hands-free apparatus 20 requests the radio apparatus 10, through the control channel, to send the call to the second ending node 40 (Step "S87"). The radio apparatus 10 sends the call to the second ending node 40 (Step "S88"). In other words the radio apparatus 10 does not send the call to the second ending node 40 until the voice channel is established. When the call is accepted by the second ending node 40, a hands-free voice communication is conducted between the second ending node 40 and the hands-free system 1 (Step "S89").

In a case where no voice channel is established within the predetermined time period after arranging the voice channel ("NO" of Step "S86"), the radio apparatus 10 and the hands-free apparatus 20 conduct no hands-free voice communication. Such a case occurs due to, e.g., an obstacle as described in the first embodiment. The radio apparatus 10 does not cancel the call as the call has not been sent to the second ending node 40. The radio apparatus 10 and the hands-free apparatus 20 go back to the state before Step "S72" through a circled "G" as illustrated in FIG. 9.

According to the sixth embodiment described above, the hands-free system may be controlled by the hands-free apparatus and obtains the same effect as in the third embodiment.

The particular hardware or software implementation of the present invention may be varied while still remaining within the scope of the present invention. It is therefore to be understood that within the scope of the appended claims and their equivalents, the invention may be practiced otherwise than as specifically described herein.

I claim:

1. A cellular phone having a first interface connectable to a radio station via a radio link and a second interface connectable to a hands-free apparatus by using a control channel and a voice channel, comprising:
    first connection means for establishing the control channel with the hands-free apparatus via the second interface;
    control means for setting a communication mode to a first mode wherein the cellular phone can receive an outgoing call from the hands-free apparatus;
    second connection means for establishing the voice channel with the hands-free apparatus if the outgoing call is received from the hands-free apparatus via the control channel;
    transmitting means for transmitting the outgoing call to the radio station; and
    canceling means for canceling the outgoing call to the radio station if the voice channel establishment with the hands-free apparatus fails.

2. The cellular phone according to claim 1, further comprising informing means for informing the hands-free apparatus, via the control channel, that the outgoing call is canceled.

3. The cellular phone according to claim 1, wherein the control means goes back to a state wherein the cellular phone can receive the outgoing call from the hands-free apparatus if the cellular phone failed to establish the voice channel with the hands-free apparatus.

4. The cellular phone according to claim 1, wherein the control means judges that the voice channel establishment with the hands-free apparatus has failed if a predetermined time period has elapsed after arranging the voice channel.

5. A cellular phone having a first interface connectable to a radio system via a radio link and a second interface connectable to a hands-free apparatus by using a control channel and a voice channel, comprising:
    connection means for establishing the control channel with the hands-free apparatus via the second interface, and for establishing the voice channel with the hands-free apparatus if an outgoing call is received from the hands-free apparatus via the control channel;
    control means for setting a communication mode to a hands-free mode wherein the cellular phone can receive the outgoing call from the hands-free apparatus if the control channel is established with the hands-free apparatus;
    transmitting means for transmitting the outgoing call to the radio station; and
    canceling means for canceling the outgoing call to the radio station if the connection means fails to establish the voice channel with the hands-free apparatus.

6. The cellular phone according to claim 5, further comprising informing means for informing the hands-free apparatus, via the control channel, that the outgoing call is canceled.

7. The cellular phone according to claim 5, wherein the control means goes back to a state wherein the cellular phone can receive the outgoing call from the hands-free apparatus if the cellular phone failed to establish the voice channel with the hands-free apparatus.

8. The cellular phone according to claim 5, wherein the control means judges that the voice channel establishment with the hands-free apparatus has failed if a predetermined time period has elapsed after trying the voice channel establishment.

9. A mobile terminal having a first interface connectable to a radio station via a radio link and a second interface connectable to a hands-free apparatus by using a control channel and a voice channel, comprising:
    connection means for establishing the control channel with the hands-free apparatus via the second interface, and for establishing the voice channel with the hands-free apparatus if an outgoing call is received from the hands-free apparatus via the control channel;
    control means for setting a communication mode to a hands-free mode wherein the mobile terminal can receive the outgoing call from the hands-free apparatus if the control channel is established with the hands-free apparatus;
    transmitting means for transmitting the outgoing call to the radio station; and
    canceling means for canceling the outgoing call to the radio station if the connection means fails to establish the voice channel with the hands-free apparatus.

10. The mobile terminal according to claim 9, further comprising informing means for informing the hands-free apparatus, via the control channel, that the outgoing call is canceled.

11. The mobile terminal according to claim 9, wherein the control means goes back to a state wherein the cellular phone can receive the outgoing call from the hands-free apparatus if the mobile terminal failed to establish the voice channel with the hands-free apparatus.

12. The mobile terminal according to claim 9, wherein the control means judges that the voice channel establishment with the hands-free apparatus has failed if a predetermined time period has elapsed after trying the voice channel establishment.

* * * * *